(12) United States Patent
Sah et al.

(10) Patent No.: US 8,628,451 B2
(45) Date of Patent: *Jan. 14, 2014

(54) METHOD AND APPARATUS FOR EXECUTING A SHIFT IN A POWERTRAIN SYSTEM

(75) Inventors: Jy-Jen F. Sah, West Bloomfield, MI (US); Lawrence A. Kaminsky, White Lake, MI (US); Anthony H. Heap, Ann Arbor, MI (US); Lisa M. Talarico, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/161,602

(22) Filed: Jun. 16, 2011

(65) Prior Publication Data

US 2012/0322610 A1  Dec. 20, 2012

(51) Int. Cl.
*B60W 10/02* (2006.01)
*B60W 10/08* (2006.01)
*B60W 20/00* (2006.01)

(52) U.S. Cl.
USPC .......................................... 477/5; 180/65.265

(58) Field of Classification Search
USPC ........................................................... 477/85
See application file for complete search history.

(56) References Cited

U.S. PATENT DOCUMENTS

| | | | |
|---|---|---|---|
| 7,226,383 B2* | 6/2007 | Namba | 477/5 |
| 7,706,949 B2* | 4/2010 | Sah et al. | 701/51 |
| 8,475,329 B2* | 7/2013 | Sah | 477/3 |
| 2005/0009665 A1* | 1/2005 | Cho | 477/5 |
| 2009/0171522 A1* | 7/2009 | Luo et al. | 701/22 |
| 2012/0059539 A1 | 3/2012 | Arnett et al. | |
| 2012/0310455 A1 | 12/2012 | Arnett | |
| 2012/0319634 A1 | 12/2012 | McGrogan et al. | |
| 2012/0322600 A1 | 12/2012 | Sah et al. | |
| 2012/0322611 A1 | 12/2012 | Heap et al. | |
| 2012/0323401 A1 | 12/2012 | McGrogan et al. | |
| 2012/0323416 A1 | 12/2012 | McGrogan et al. | |
| 2012/0323418 A1 | 12/2012 | Sah et al. | |
| 2012/0323461 A1 | 12/2012 | Martini et al. | |

\* cited by examiner

*Primary Examiner* — David D Le
*Assistant Examiner* — Mark Manley

(57) ABSTRACT

A method for activating an oncoming clutch in a transmission includes monitoring rotational speeds of clutch elements of the oncoming clutch wherein the clutch elements are coupled to first and second rotationally independent torque actuators. A control speed profile for the first rotationally independent torque actuator is commanded. A speed profile of the oncoming clutch approaching zero speed is generated as is a control speed profile for the second rotationally independent torque actuator corresponding to a speed of the first rotationally independent torque actuator, the speed profile of the oncoming clutch, and an output speed of the transmission. A speed of the second rotationally independent torque actuator is controlled using the control speed profile for the second rotationally independent torque actuator. A speed of the oncoming clutch is monitored and the oncoming clutch is activated when the speed of the oncoming clutch is zero.

4 Claims, 3 Drawing Sheets

METHOD AND APPARATUS FOR EXECUTING A SHIFT IN A POWERTRAIN SYSTEM

TECHNICAL FIELD

This disclosure is related to vehicle powertrain systems and shift execution.

BACKGROUND

The statements in this section merely provide background information related to the present disclosure. Accordingly, such statements are not intended to constitute an admission of prior art.

Powertrain systems including hybrid powertrains, electric vehicles, and extended range electric vehicles are configured to operate in a plurality of operating modes. Such powertrain systems use torque generators, clutches and transmissions to transfer torque to a driveline. Executing a shift from an initial operating mode to a target operating mode may include executing a direct shift process that includes deactivating an off-going clutch and activating an oncoming clutch. Known powertrain systems maintain propulsion torque during a shift by slipping either an oncoming clutch or an off-going clutch while synchronizing speeds of clutch elements of the oncoming clutch before fully applying the oncoming clutch, with an applied clutch that is common for the first and second states being continuously applied during the shift execution. Synchronizing the speeds of the clutch elements includes controlling operation of one or more of the torque generators to achieve a synchronization speed.

Known issues associated with executing a direct shift process include driveline power loss and energy loss during clutch application. The power loss during clutch slippage may be discernible by a vehicle operator.

SUMMARY

A method for activating an oncoming clutch in a transmission includes monitoring rotational speeds of clutch elements of the oncoming clutch wherein the clutch elements are coupled to first and second rotationally independent torque actuators. A control speed profile for the first rotationally independent torque actuator is commanded. A speed profile of the oncoming clutch approaching zero speed is generated as is a control speed profile for the second rotationally independent torque actuator corresponding to a speed of the first rotationally independent torque actuator, the speed profile of the oncoming clutch, and an output speed of the transmission. A speed of the second rotationally independent torque actuator is controlled using the control speed profile for the second rotationally independent torque actuator. A speed of the oncoming clutch is monitored and the oncoming clutch is activated when the speed of the oncoming clutch is zero.

BRIEF DESCRIPTION OF THE DRAWINGS

One or more embodiments will now be described, by way of example, with reference to the accompanying drawings, in which

FIGS. 3-1 through 3-5 illustrate progression of a first shift sequence for a powertrain system using the control scheme of FIG. 2 in accordance with the disclosure;

FIG. 4 illustrates a control flowchart that details operating the powertrain system to control the first and second torque machines and the engine to synchronize the speeds of the elements of the oncoming clutch coincident with controlling output torque to the driveline and activating the oncoming clutch when the speeds of the elements of the oncoming clutch are synchronized in accordance with the disclosure; and FIG. 5 illustrates operation of the powertrain system described with reference to FIG. 1 employing the control system described with reference to FIGS. 2, 3, and 4 to execute a shift from an initial operating mode to a target operating mode that includes deactivating an off-going clutch and activating an oncoming clutch, in accordance with the disclosure.

DETAILED DESCRIPTION

Figure 1:
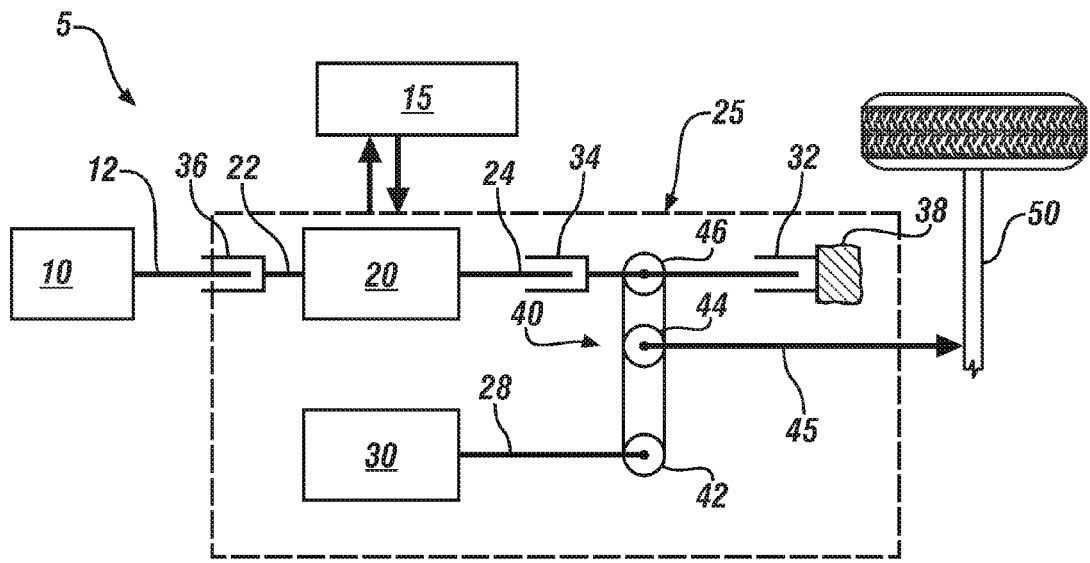
FIG. 1 illustrates an exemplary powertrain system including an internal combustion engine, first and second torque machines, and planetary gear set coupled to a driveline in accordance with the disclosure.

Referring now to the drawings, wherein the showings are for the purpose of illustrating certain exemplary embodiments only and not for the purpose of limiting the same, FIG. 1 is a schematic diagram of an exemplary powertrain system 5. The powertrain system 5 includes torque actuators including an internal combustion engine 10 and first and second torque machines 20 and 30 respectively, and a transmission 25 preferably including a planetary gear set 40. The powertrain system 5 is coupled to a driveline 50 to transfer tractive torque therebetween. The internal combustion engine 10 and the first and second torque machines 20, 30 are any suitable machines. In one embodiment, the first and second torque machines 20, 30 are multiphase electric motor/generator devices that electrically connect to a high-voltage power source via an electric power inverter. A control system 15 is configured to control operation of the powertrain system 5. The powertrain system 5 is meant to be illustrative but not limiting. Like numerals refer to like elements throughout the description.

The engine 10 is configured to execute autostart and autostop control schemes and fuel cutoff (FCO) control schemes during ongoing operation of the powertrain system 5. By way of definition, the engine 10 is considered to be in an engine-off (OFF) state when it is not being fueled and is not rotating. The engine 10 is considered to be in a fuel-cutoff (FCO) state when it is rotating but is not fueled and firing. The engine 10 is considered to be in an engine-on (ON) state when it is fueled and firing and preferably generating torque. As is appreciated, an autostop event occurs when engine operation is discontinued and the internal combustion engine 10 is in an OFF state and is not rotating during ongoing powertrain operation to conserve fuel. As is appreciated, an autostart event is executed subsequent to executing an autostop event to start or restart engine operation during ongoing powertrain operation. The engine 10 is started primarily to provide power to the first torque machine 20 to generate energy that may be used to generate tractive torque by one or both the first and second torque machines 20, 30. The engine 10 may be started to provide tractive torque to the driveline 50.

The powertrain system 5 includes first, second, and third torque-transfer devices C1 32, C2 34, and C3 36, respectively, which may be any suitable clutch elements, e.g., friction clutch packs, brakes, band clutches, and one-way clutches. All torque transfer devices are simply referred to herein as clutches. The first clutch C1 32 is a brake that is configured to couple a ring gear element 46 of the planetary gear set 40 to a transmission case ground 38 when activated. The second clutch C2 34 is configured to couple the ring gear element 46 of the planetary gear set 40 to an output member 24 of the first torque machine 20 when activated. The third clutch C3 36 is configured to couple an input member 22 of the first torque machine 20 to an output member 12 of the engine 10 when activated. An input member 28 of the second torque machine 30 couples to a sun gear element 42 of the planetary gear set 40. An output member 45 coupled to a planet gear assembly 44 of the planetary gear set 40 couples to the driveline 50.

Table 1 describes clutch activations associated with specific operating modes of the powertrain system 5 of FIG. 1. The designation 'x' indicates that the corresponding clutch is activated when in the corresponding operating mode.

TABLE 1

| Operating Mode | C1 | C2 | C3 |
|---|---|---|---|
| Neutral 1 | | | |
| Neutral 2 | | | x |
| Mode 1 (1 motor EV) | x | | |
| Mode 2 (2 motor EV) | | x | |
| Mode 3 (Series) | x | | x |
| Mode 4 (Load Share) | | x | x |
| Transition Mode | x | x | |

Each of the operating modes of the powertrain system indicates which of the torque actuators of the powertrain, i.e., the internal combustion engine 10 and the first and second torque machines 20, 30 is generating tractive torque, if any. "EV" indicates electric vehicle operation, i.e., tractive torque being generated by one or both of the first and second torque machines 20, 30. The engine 10 is preferably in the OFF state during the electric vehicle operation, although such operation is not required.

The first neutral mode (Neutral 1) indicates that no tractive torque is being generated, and it is accomplished with the first, second, and third torque-transfer clutches C1 32, C2 34, and C3 36, respectively, being deactivated.

The second neutral mode (Neutral 2) indicates that no tractive torque is being generated, and it is accomplished with the first and second torque-transfer clutches C1 32 and C2 34 being deactivated. The third torque-transfer clutch C3 36 is activated, permitting torque transfer between the engine 10 and the first torque machine 20. This may include electric power generation, i.e., power flow from the engine 10 to the first torque machine 20 or may include engine starting, i.e., power flow from the first torque machine 20 to the engine 10.

Mode 1 (1 motor EV) is a first electric vehicle mode wherein tractive torque is generated by torque machine 30. In this embodiment, the second torque machine 30 generates tractive torque and the engine 10 and the first torque machine 20 are decoupled from the driveline 50 by deactivation of the second and third torque-transfer clutches C2 34 and C3 36. The first torque-transfer clutch C1 32 is activated to ground the ring gear 46 to transfer torque and speed of the second torque machine 30 to the driveline 50.

Mode 2 (2 motor EV) is a second electric vehicle mode wherein tractive torque is generated by both the first and second torque machines 20, 30. The engine 10 is decoupled from the driveline 50 by deactivation of the third torque-transfer clutch C3 36. The second torque-transfer clutch C2 34 is activated to combine and transfer torque and speed from the first and second torque machines 20, 30 through the planetary gear set 40 to the driveline 50.

Mode 3 (Series) is a series-hybrid mode wherein tractive torque is generated by the second torque machine 30 and the engine 10 is coupled to the first torque machine 20 by activation of the third torque-transfer clutch C3 36 to generate electric power that is preferably used by the second torque machine 30. The engine 10 is decoupled from the driveline 50 by deactivation of the second torque-transfer clutch C2 34. The first torque-transfer clutch C1 32 is activated to ground the ring gear 46 to transfer torque and speed of the second torque machine 30 to the driveline 50.

Mode 4 (Load Share) is an engine-on load share mode wherein tractive torque is generated by both the first second torque machines 20, 30, by activation of the second torque-transfer clutch C2 34 and the third torque-transfer clutch C3 36. The engine 10 preferably operates to transfer torque to the first torque machine 20 to generate electric power. The first torque-transfer clutch C1 32 is deactivated. The second torque-transfer clutch C2 34 and the third torque-transfer clutch C3 36 are activated to combine and transfer torque and speed from the engine 10 and the first and second torque machines 20, 30 through the planetary gear set 40 to the driveline 50.

The Transition Mode is an operating mode that is preferably utilized exclusively during a mid-shift, which may include a shift between the series-hybrid mode (Mode 3) and the load share mode (Mode 4) and a shift between the first and second electric vehicle modes (Modes 1 and 2). The Transition Mode includes the first torque-transfer clutch C1 32 activated, the second torque-transfer clutch C2 34 activated and the third torque-transfer clutch C3 36 deactivated.

Figure 2:
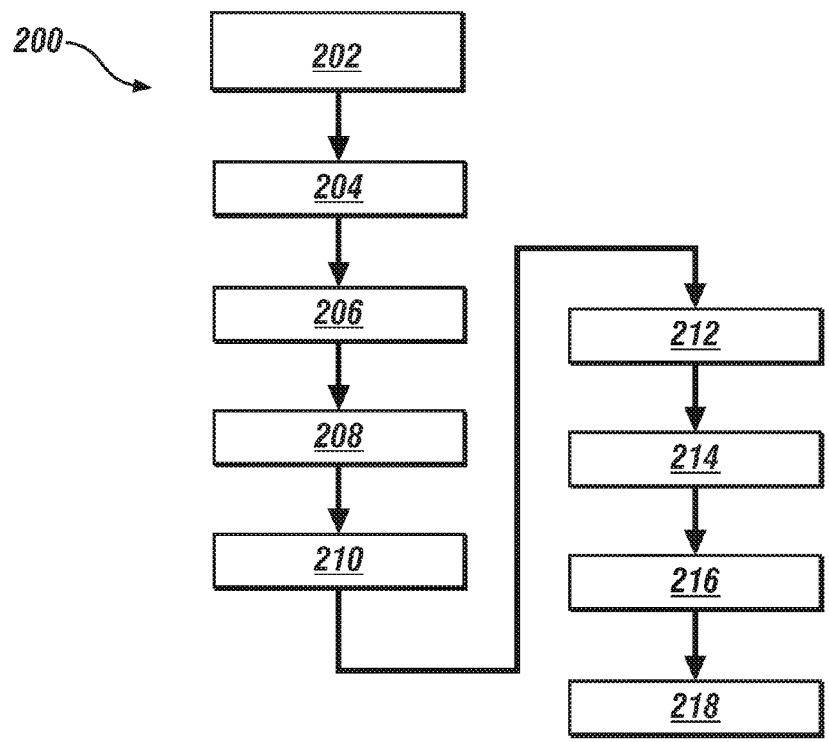
FIG. 2 illustrates a control flowchart, including sequentially executed steps to effect a shift from a first powertrain operating mode to a second powertrain operating mode in accordance with the disclosure.

FIG. 2 illustrates a control scheme 200 that includes steps that are sequentially executed to effect a shift from an initial operating mode to a target operating mode. The control scheme 200 is described with reference to the illustrated powertrain system 5 of FIG. 1 to effect a shift between a first of the operating modes described in Table 1 to a second of the operating modes described in Table 1 during ongoing operation. It is preferred to control torque output to the driveline 50 so that a shift is imperceptible to a vehicle operator. It is appreciated that a synchronous shift is preferred to minimize clutch application at non-synchronous speeds, thus minimizing power losses and heat generation. By way of example, the powertrain system 5 illustrated with reference to FIG. 1 includes Mode 3 (Series) with clutches C1 32 and C3 36 activated and Mode 4 (Load Share) with clutches C2 34 and C3 36 activated. Clutch C3 36 is activated in both Mode 3 and Mode 4, enabling the engine 10 to provide torque for either electric power generation (Mode 3) or torque and electric power generation (Mode 4). Thus, for the embodiment described with reference to FIG. 1, the control scheme 200 encompasses a shift from Mode 3 (Series) to Mode 4 (Load Share) and a shift from Mode 4 (Load Share) to Mode 3 (Series).

The control scheme 200 is implemented as one or a plurality of algorithms that are executed in the control module 15. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event. Table 2 is provided as a key to FIG. 2 wherein the numerically labeled blocks and the corresponding functions are set forth as follows.

TABLE 2

| BLOCK | BLOCK CONTENTS |
|---|---|
| 202 | Command Shift |
| 204 | Offload common clutch |
| 206 | Deactivate common clutch |
| 208 | Operate in one of Mode 1 or Mode 2 to synchronize speeds of elements of oncoming clutch |
| 210 | Activate oncoming clutch |
| 212 | Offload off-going clutch |
| 214 | Deactivate off-going clutch |
| 216 | Operate in one of Mode 2 or Mode 1 to synchronize speeds of elements of common clutch |
| 218 | Activate common clutch |

During ongoing operation, a shift is commanded (202). The commanded shift may be a shift between Mode 3 (Series) and Mode 4 (Load Share), either from Mode 3 to Mode 4 or from Mode 4 to Mode 3. The commanded shift may be a shift between Mode 1 (1 Motor EV mode) and Mode 2 (2 Motor EV mode), either from Mode 1 to Mode 2 or from Mode 2 to Mode 1. It is appreciated that shifts between other operating modes may instead be commanded, but are outside the scope of the control scheme 200.

The commanded shift includes a sequence of events that includes deactivating the common clutch, i.e., C3 36 during an interim period as described herein. As such, the control system offloads torque from the common clutch, e.g., by increasing (or decreasing) power output from the first torque machine 20 and/or decreasing (or increasing) power output from the engine 10 to neutralize torque across clutch C3 36 (204).

When the torque across common clutch C3 36 is neutralized, clutch C3 36 is deactivated (206). The powertrain system 5 then operates in one of the powertrain operating modes, e.g., Mode 1 or Mode 2 in accordance with the still activated clutch C1 32 or C2 34, respectively, to synchronize speeds of elements of the oncoming clutch (208).

When shifting to Mode 4 (Load Share), clutch C1 32 is still activated during this period in the shift process and the powertrain operating mode is presently Mode 1 (1 motor EV). The speed of the first torque machine 20 is controlled to synchronize the oncoming clutch C2 34 with the speed of the ring gear 46 of the planetary gear set 40. When shifting to Mode 3 (Series), clutch C2 34 is still activated during this period in the shift process and the powertrain operating mode is presently Mode 2 (2 motor EV). The speeds of the first and second torque machines 20 and 30 are controlled to synchronize the speed of the ring gear 46 of the planetary gear set 40 with the transmission case ground 38, i.e., the speeds of the first and second torque machines 20 and 30 are suitably controlled to stop rotation of the ring gear 46 and thus synchronize the speed of clutch C1 32 with the transmission case ground 38.

When the speeds of elements of the oncoming clutch are synchronized, the oncoming clutch is activated (210), and the powertrain system 5 operates in the Transition Mode with clutches C1 32 and C2 34 activated. By synchronizing the speeds of the elements of the oncoming clutch prior to activation, the oncoming clutch may be activated without slipping, i.e., is synchronously activated. The powertrain system 5 then operates in the Transition Mode to offload torque from the off-going clutch (212).

When shifting to Mode 4 (Load Share), clutch C1 32 is the off-going clutch and the outputs of the first and second torque machines 20 and 30 are controlled to offload torque thereacross. When shifting to Mode 3 (Series), clutch C2 34 is the off-going clutch, and the torques of the first and second torque machines 20 and 30 are controlled to offload torque thereacross.

When torque across the off-going clutch is offloaded, the off-going clutch is deactivated (214). The powertrain system 5 operates in one of the powertrain operating modes Mode 1 or Mode 2 to control the first and second torque machines 20 and 30 and control operation of the engine 10 to synchronize the speeds of the elements of the oncoming clutch, i.e., clutch C3 36 (216). This is described in detail with reference to FIGS. 4 and 5.

When shifting to Mode 4 (Load Share), clutch C2 34 is the still activated clutch, and the powertrain operating mode is presently Mode 2 (2 motor EV). The speeds of the engine 10 and the first and second torque machines 20 and 30 are controlled to synchronize the speeds of the elements of the oncoming clutch C3 36 without affecting the output torque to the output member 45 coupled to the driveline 50.

When shifting to Mode 3 (Series), clutch C1 32 is the still activated clutch, and the powertrain operating mode is presently Mode 1 (1 motor EV). The speeds of the engine 10 and the first torque machine 20 are controlled to synchronize the speeds of the elements of the oncoming clutch C3 36. The output torque to the output member 45 coupled to the driveline 50 is maintained by the second torque machine 30.

When the speeds of the elements of the common clutch, i.e., clutch C3 36 are synchronized, clutch C3 36 is activated (218). The shift is complete, and the powertrain system 5 operates in the target operating mode.

FIGS. 3-1 through 3-5 depict progression of an exemplary first shift sequence from Mode 3 (Series) to Mode 4 (Load Share) for the powertrain system 5 using the sequentially executed control scheme 200 depicted with reference to FIG. 2. FIGS. 3-1 through 3-5 each shows the powertrain system 5 of FIG. 1 with selected ones of the first, second and third clutches C1 32, C2 34, and C3 36 activated or deactivated, with activation indicated by broken line ovals.

Figures 1, 3:
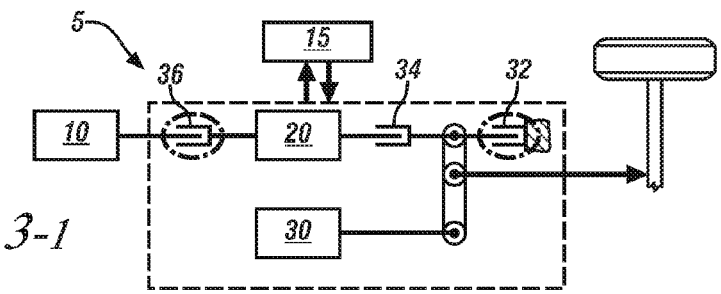
Figures 2, 3:
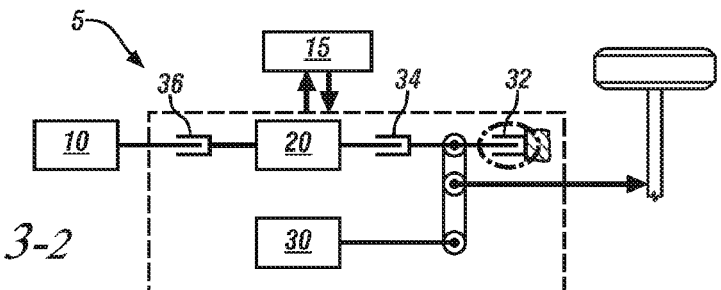
Figure 3:
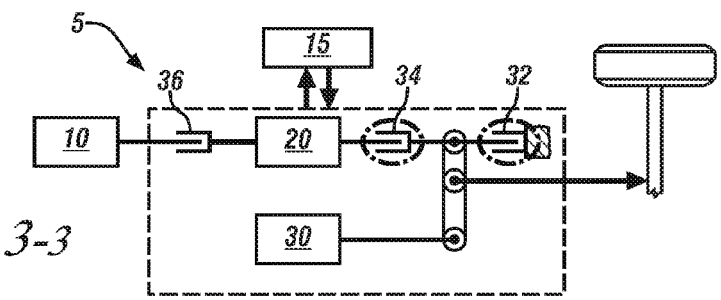
Figures 3, 4:
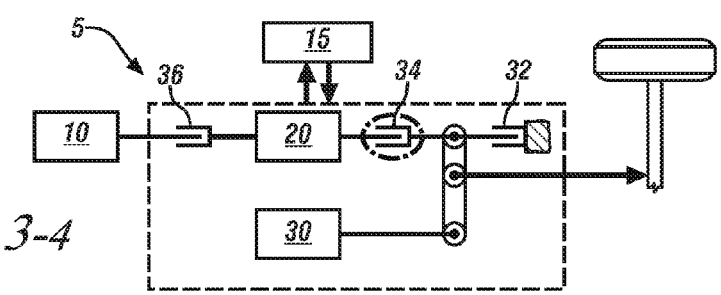
Figures 3, 4, 5:
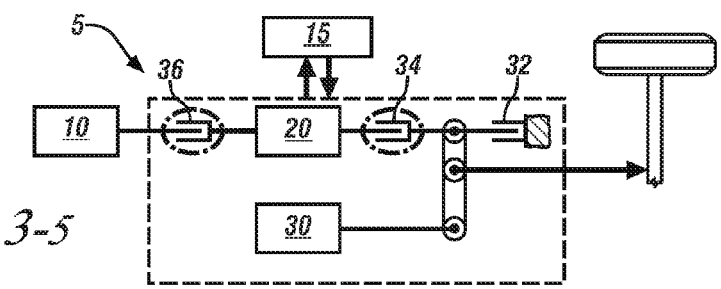
Figure 4:
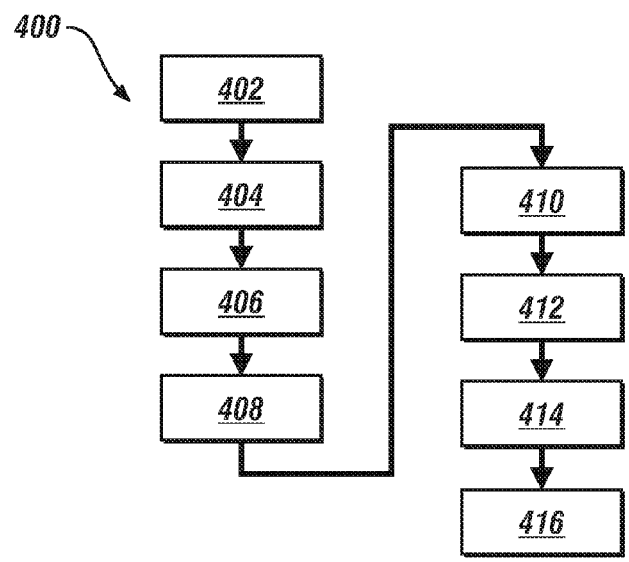
Figure 5:
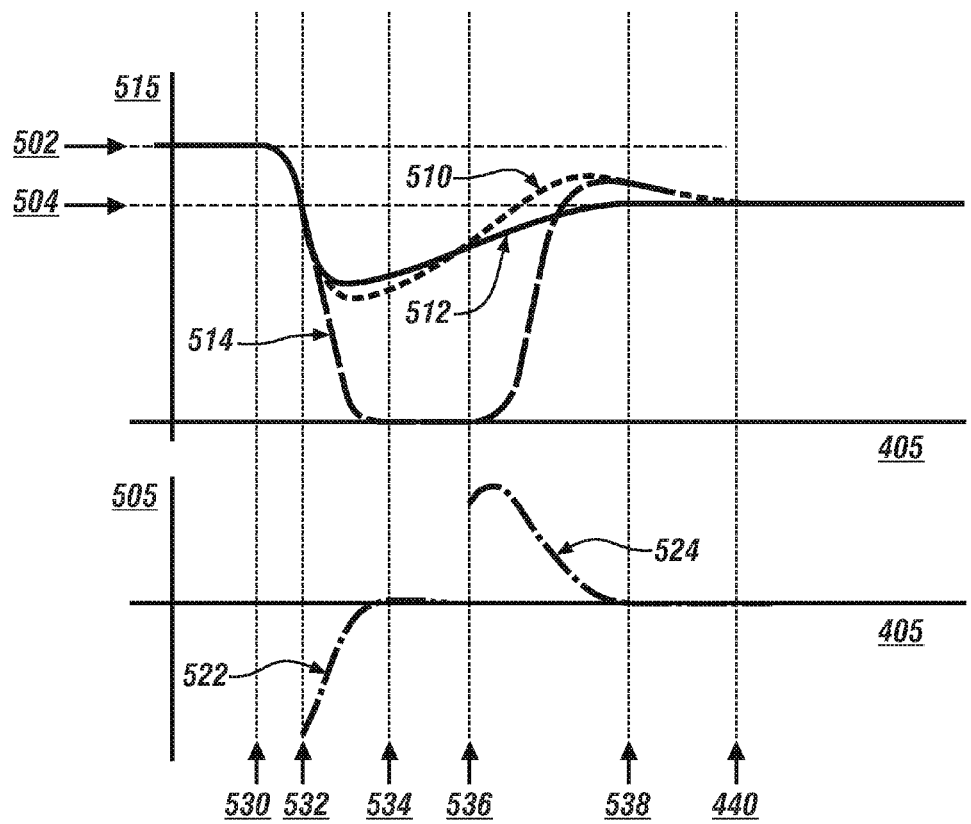

FIG. 3-1 shows initial operation in Mode 3 (Series) with clutches C1 32 and C3 36 activated. FIG. 3-2 shows operation in Mode 1 (1 motor EV) with clutch C1 32 activated after the common clutch C3 36 is deactivated. FIG. 3-3 shows operation in the Transition Mode with clutches C1 32 and C2 34 activated after clutch C2 34 has been activated. FIG. 3-4 shows operation in Mode 2 (2 motor EV) with clutch C2 34 activated after clutch C1 32 is deactivated. FIG. 3-5 shows operation in Mode 4 (Load Share) with clutches C2 34 and common clutch C3 36 activated, after common clutch C3 36 is activated to end the shift sequence.

FIG. 4 shows a control scheme 400 flowchart that details operating the powertrain system 5 in one of the powertrain operating modes to control the first and second torque machines 20 and 30 and the engine 10 to synchronize the speeds of the elements of an oncoming clutch coincident with controlling output torque to the driveline 50 in response to an operator torque request, and activating the oncoming clutch when the speeds of the elements of the oncoming clutch are synchronized. It is appreciated that activating the oncoming clutch is associated with executing a shift to a target operating mode of the powertrain system 5.

The control scheme 400 is particularly suited to synchronizing the speeds of elements of an oncoming clutch wherein the clutch elements are coupled to torque actuators that are presently operatively and rotationally independent. In one embodiment, the oncoming clutch includes activated clutch C3 36 and the operatively and rotationally independent torque actuators include the engine 10 and the first torque machine 20. The control scheme 400 acts to synchronize the speeds of the elements of the oncoming clutch, i.e., drive the speed to zero or drive the speed differential between the elements of the oncoming clutch to zero prior to activating the oncoming clutch. During execution of the control scheme 400, the output torque to the output member 45 coupled to the driveline 50 is generated by coordinating outputs of the first and second torque machines 20 and 30. The control scheme 400 takes into account inertias of the engine 10 and the first and second torque machines 20 and 30 and corresponding effects upon rotational speeds and accelerations. The control scheme 400 is responsive to engine speed regardless of the commanded engine operation during and prior to the shift command and associated activation of the oncoming clutch.

Table 3 is provided as a key to FIG. 4 wherein the numerically labeled blocks and the corresponding functions of the control scheme 400.

TABLE 3

| BLOCK | BLOCK CONTENTS |
|---|---|
| 402 | Monitor Ne, Ni, No, Na, Nb |
| 404 | Command Ne_profile |
| 406 | Monitor oncoming clutch speed: NC3 = f(Ni, No, Ne) |
| 408 | Generate speed profile of oncoming clutch: NC3 Profile |
| 410 | Generate Ni_Profile: Ni_Profile = g(NC3_profile, No, Ne) |
| 412 | Control input speed: Ni = Ni_Profile |
| 414 | Monitor oncoming clutch speed: NC3 = f(Ni, No, Ne) |
| 416 | Activate oncoming clutch when oncoming clutch speed is zero: NC3 = 0 |

The control scheme 400 is described with reference to oncoming clutch C3 36 located between the engine 10 and the first torque machine 20. The control scheme 400 contemplates other embodiments wherein the clutch elements are coupled to torque actuators that are operatively and rotationally independent. The oncoming clutch C3 36 located between the engine 10 and the first torque machine 20 is initially deactivated, and the engine 10 and the first torque machine 20 are independently controlled.

Operation of the powertrain system 5 is monitored, including monitoring engine speed (Ne), input speed (Ni), output speed (No), and rotational speed of the second torque machine (Nb) using suitable speed sensors and resolvers (402). Rotational speed of the first torque machine (Na) is equivalent to or may be directly derived from the input speed (Ni) in this embodiment.

A control speed profile for a first one of the independent torque actuators associated with the elements of the oncoming clutch is commanded (Ne_profile) (404). As shown, the first one of the independent torque actuators is the engine with the control speed profile for the engine commanded. The control speed profile includes a projected time-rate change in the engine speed between its present speed and a preferred engine speed associated with operating in the target operating mode, which may be less than the present speed when a transmission upshift event is being executed.

Actual speed of the independent torque actuator associated with the oncoming clutch is monitored, which is the engine speed (Ne)

Speed of the oncoming clutch is determined, and is a direct physical relation between the input speed (Ni), the output speed (No), and the engine speed (Ne), i.e., NC3=f(Ni, No, Ne) (406).

A speed profile for the oncoming clutch is generated (NC3_Profile) with the speed achieving zero speed, e.g., after an elapsed time period. The speed profile for the oncoming clutch is a suitable independent speed profile (408).

The actual speed of the oncoming clutch C3 is determined in relation to the actual input speed (Ni), the output speed (No), and the actual engine speed (Ne), all of which are measured. Thus, the speed profile of the oncoming clutch (NC3 Profile), the output speed (No), and the actual engine speed (Ne) may be used to generate a control speed profile for the second torque actuator, i.e., the first torque machine (Ni_Profile=g(NC3_profile, No, Ne)) (410). The actual speed of the oncoming clutch C3 is determined based upon the physical relationship between the independent torque actuators associated with the elements of the oncoming clutch, i.e., the engine and the first torque machine, and uses the actual engine speed (Ne) to adjust for any errors between the control speed profile for the engine and the actual engine speed (Ne). Thus the speed profile of the oncoming clutch (NC3_profile) is additively projected onto the actual engine speed (Ne).

The control speed profile of the second torque actuator (Ni_Profile) is used to control operation of the second torque actuator, i.e., the first torque machine (412). Thus, when synchronizing the oncoming clutch, i.e., clutch C3, the control speed profile of the first torque actuator (Ne_Profile) is controlled independently of the control speed profile of the second torque actuator (Ni_Profile). Instead the control speed profile of the second torque actuator (Ni_Profile) is coordinated in response to the actual engine speed (Ne).

Speed of the oncoming clutch continues to be monitored as the direct physical relation between the input speed (Ni), the output speed (No), and the engine speed (Ne), i.e., NC3=f(Ni, No, Ne). The speed of the oncoming clutch is a difference between the monitored speed of the first torque actuator, i.e., actual engine speed (Ne) and the monitored speed of the second torque actuator, i.e., input speed (Ni) (414). The oncoming clutch is preferably activated when the speed of the oncoming clutch is zero (416).

FIG. 5 graphically shows operation of the powertrain system 5 described with reference to FIG. 1 employing the control scheme 400 described with reference to FIG. 4 to execute a shift from an initial operating mode to a target operating mode, with particular focus on activating an oncoming clutch when the clutch elements are coupled to torque actuators that are operatively and rotationally independent. The illustrated shift execution is non-limiting and depicts shifting from Mode 3 to Mode 4 with clutch C3 36 as the first off-going clutch and clutch C2 34 as the first oncoming clutch, followed by clutch C1 32 as a second off-going clutch and clutch C3 36 as the second oncoming clutch referred to in the control scheme 400. Elapsed time 405 is shown on the x-axis, with specific time points indicated as described herein. The y-axis includes a rotational speed axis 515 and a clutch speed axis 505. Depicted data associated with the rotational speed axis 515 includes actual engine speed (Ne) 510, engine speed profile (Ne_profile) 512, control speed profile of the second torque actuator (Ni_Profile)

514, a preferred engine speed associated with operating in the initial operating mode 502, and a preferred engine speed associated with operating in the target operating mode 504. Depicted data associated with the clutch speed axis 505 includes a speed for off-going clutch C2 522 and a speed for oncoming clutch C3 524.

Prior to time point 530, the powertrain system 5 is operating in Mode 3 with clutches C1 and C3 activated. A shift to Mode 4 is commanded, and is initiated at time point 530, at which point clutch C3 is commanded to be deactivated. The actual engine speed 510 and the speed of the first torque machine 514 decrease independently in anticipation of the shift.

At time point 532, clutch C3 is deactivated, and the speed of the first torque machine 514 is reduced to zero. When the speed of the first torque machine 514 achieves zero at time point 534, elements of clutch C2 are synchronized and clutch C2 is activated. Clutch C1 is coincidentally deactivated, with this operation completed at time point 536.

Synchronization of clutch elements of the oncoming clutch C3 begins at time point 536. The initial speed for the engine speed profile 512 may be synchronized with the actual engine speed 510 (as shown), although this is not required. The preferred engine speed 504 associated with operating in the target operating mode, i.e., Mode 4 is used to generate the engine speed profile (Ne_profile) 512. Operation of the engine 10 is commanded using the engine speed profile 512. The actual engine speed (Ne) 510 is monitored.

The speed for the oncoming clutch C3 524 is a time-coincident arithmetic difference between the elements of the oncoming clutch C3, i.e., a difference between the actual engine speed 510 and the input speed 514, taking into account the mechanical relation between the input speed 514 and transmission output speed.

A desired clutch C3 profile (not shown), transmission output speed, and the actual engine speed 510 are used to generate an input speed profile (Ni_profile) 514, which is the aforementioned control speed profile of the second torque actuator.

The input speed profile 514 is used to control the speed of the first torque machine 20, i.e., to control the input speed. As is appreciated, the input speed profile 514 and the speed of the first torque machine 20 are essentially the same speed.

The clutch elements of the oncoming clutch C3 are synchronized at time point 538 when the input speed profile 514 synchronizes with the actual engine speed 510 and the oncoming clutch C3 is activated.

The actual engine speed 510 and the input speed profile 514 decrease, as shown, and coincide with the preferred engine speed 504 associated with operating in the target operating mode, i.e., Mode 4 at time point 440, thus completing the shift execution.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for clutch control for a transmission, comprising:
    deactivating a first clutch associated with a target operating mode;
    activating an oncoming clutch associated with the target operating mode and deactivating an off-going clutch associated with an initial operating mode; and then
    reactivating the first clutch, comprising:
        monitoring rotational speeds of clutch elements of the first clutch, the clutch elements coupled to first and second torque actuators, wherein the first and second torque actuators are presently rotationally independent,
        commanding a control speed profile for the first torque actuator,
        generating a speed profile of the first clutch approaching zero speed,
        generating a control speed profile for the second torque actuator corresponding to a speed of the first torque actuator, the speed profile of the first clutch, and an output speed of the transmission,
        controlling a speed of the second torque actuator using the control speed profile for the second torque actuator and coincidently coordinating outputs of the second torque actuator and a third torque actuator to generate an output torque to the output member that is responsive to an output torque request,
        monitoring a speed of the first clutch, and
        activating the first clutch when the speed of the first clutch is zero.

2. The method of claim 1, wherein generating the control speed profile for the second torque actuator comprises additively projecting the speed profile of the oncoming clutch onto the control speed profile corresponding to the speed of the first torque actuator.

3. The method of claim 1, wherein commanding the control speed profile for the first torque actuator comprises commanding the control speed profile for the first torque actuator to achieve a target control speed corresponding to a preferred speed associated with operating in a target operating mode when the oncoming clutch is activated.

4. The method of claim 1, wherein the first torque actuator comprises an internal combustion engine and the second torque actuator comprises an electric machine.

* * * * *